US010607355B2

(12) United States Patent
Raichelgauz et al.

(10) Patent No.: US 10,607,355 B2
(45) Date of Patent: Mar. 31, 2020

(54) METHOD AND SYSTEM FOR DETERMINING THE DIMENSIONS OF AN OBJECT SHOWN IN A MULTIMEDIA CONTENT ITEM

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 841 days.

(21) Appl. No.: 14/608,880

(22) Filed: Jan. 29, 2015

(65) Prior Publication Data

US 2015/0139569 A1    May 21, 2015

Related U.S. Application Data

(63) Continuation-in-part of application No. 14/096,865, filed on Dec. 4, 2013, and a continuation-in-part of
(Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
  *G06T 7/60* (2017.01)
  *G06N 99/00* (2019.01)
  (Continued)

(52) U.S. Cl.
  CPC .............. *G06T 7/60* (2013.01); *G06F 16/434* (2019.01); *G06F 16/7837* (2019.01);
  (Continued)

(58) Field of Classification Search
  None
  See application file for complete search history.

(56) References Cited

U.S. PATENT DOCUMENTS

| 4,733,353 A | 3/1988 | Jaswa |
| 4,932,645 A | 6/1990 | Schorey et al. |
| (Continued) | | |

FOREIGN PATENT DOCUMENTS

| EP | 1085464 A3 | 1/2007 |
| WO | 0231764 | 4/2002 |
| (Continued) | | |

OTHER PUBLICATIONS

Chuan-Yu Cho, et al., "Efficient Motion-Vector-Based Video Search Using Query by Clip", 2004, IEEE, Taiwan, pp. 1-4.
(Continued)

*Primary Examiner* — Li Wu Chang
(74) *Attorney, Agent, or Firm* — Reches patents

(57) ABSTRACT

A method and system for determining at least a size dimension of objects shown in multimedia content items are presented. The method includes receiving an input multimedia content item; identifying objects shown in the multimedia content item; generating at least a first signature for at least a first object of the plurality of objects and at least a second signature for at least a second object; identifying at least one concept that matches the at least a first object; determining an actual size of the first object respective of the match to the at least one concept; determining a size scale between the first object and the second object using the at least a first signature and the at least a second signature; and determining the at least size dimension of the second object respective of the size scale and the actual size of the first object.

18 Claims, 5 Drawing Sheets

Related U.S. Application Data application No. 13/624,397, filed on Sep. 21, 2012, now Pat. No. 9,191,626, which is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, and a continuation-in-part of application No. 12/084,150, filed as application No. PCT/IL2006/001235 on Oct. 26, 2006, now Pat. No. 8,655,801.

(60) Provisional application No. 62/030,085, filed on Jul. 29, 2014.

(51) Int. Cl.

| | | |
|---|---|---|
| *G06K 9/64* | (2006.01) | |
| *G06T 1/00* | (2006.01) | |
| *G06F 16/432* | (2019.01) | |
| *G06F 16/783* | (2019.01) | |
| *G09B 19/00* | (2006.01) | |
| *H04N 21/258* | (2011.01) | |
| *H04N 21/2668* | (2011.01) | |
| *H04N 7/173* | (2011.01) | |
| *H04H 60/59* | (2008.01) | |
| *H04N 21/81* | (2011.01) | |
| *H04H 60/48* | (2008.01) | |
| *H04N 21/466* | (2011.01) | |
| *G06F 16/957* | (2019.01) | |

(52) U.S. Cl.
CPC ............ *G06F 16/957* (2019.01); *G06K 9/64* (2013.01); *G06T 1/0021* (2013.01); *G09B 19/0092* (2013.01); *H04H 60/48* (2013.01); *H04H 60/59* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | | |
|---|---|---|---|
| 4,972,363 | A | 11/1990 | Nguyen et al. |
| 5,214,746 | A | 5/1993 | Fogel et al. |
| 5,307,451 | A | 4/1994 | Clark |
| 5,412,564 | A | 5/1995 | Ecer |
| 5,436,653 | A * | 7/1995 | Ellis .................. G06K 9/00711 725/22 |
| 5,568,181 | A | 10/1996 | Greenwood et al. |
| 5,638,425 | A | 6/1997 | Meador et al. |
| 5,745,678 | A | 4/1998 | Herzberg et al. |
| 5,763,069 | A | 6/1998 | Jordan |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,978,754 | A | 11/1999 | Kumano |
| 5,991,306 | A | 11/1999 | Burns et al. |
| 6,052,481 | A | 4/2000 | Grajski et al. |
| 6,070,167 | A | 5/2000 | Qian et al. |
| 6,076,088 | A | 6/2000 | Paik et al. |
| 6,122,628 | A | 9/2000 | Castelli et al. |
| 6,128,651 | A | 10/2000 | Cezar |
| 6,137,911 | A | 10/2000 | Zhilyaev |
| 6,144,767 | A | 11/2000 | Bottou et al. |
| 6,147,636 | A | 11/2000 | Gershenson |
| 6,163,510 | A | 12/2000 | Lee et al. |
| 6,243,375 | B1 | 6/2001 | Speicher |
| 6,243,713 | B1 | 6/2001 | Nelson et al. |
| 6,275,599 | B1 | 8/2001 | Adler et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,507,672 | B1 | 1/2003 | Watkins et al. |
| 6,523,046 | B2 | 2/2003 | Liu et al. |
| 6,524,861 | B1 | 2/2003 | Anderson |
| 6,550,018 | B1 | 4/2003 | Abonamah et al. |
| 6,557,042 | B1 | 4/2003 | He et al. |
| 6,594,699 | B1 | 7/2003 | Sahai et al. |
| 6,601,026 | B2 | 7/2003 | Appelt et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,681,032 | B2 | 1/2004 | Bortolussi et al. |
| 6,704,725 | B1 | 3/2004 | Lee |
| 6,732,149 | B1 | 5/2004 | Kephart |
| 6,742,094 | B2 | 5/2004 | Igari |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,813,395 | B1 | 11/2004 | Kinjo |
| 6,819,797 | B1 | 11/2004 | Smith et al. |
| 6,845,374 | B1 | 1/2005 | Oliver et al. |
| 6,877,134 | B1 | 4/2005 | Fuller et al. |
| 6,901,207 | B1 | 5/2005 | Watkins |
| 6,938,025 | B1 | 8/2005 | Lulich et al. |
| 6,985,172 | B1 | 1/2006 | Rigney et al. |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,023,979 | B1 | 4/2006 | Wu et al. |
| 7,043,473 | B1 | 5/2006 | Rassool et al. |
| 7,047,033 | B2 | 5/2006 | Wyler |
| 7,158,681 | B2 | 1/2007 | Persiantsev |
| 7,199,798 | B1 | 4/2007 | Echigo et al. |
| 7,215,828 | B2 | 5/2007 | Luo |
| 7,260,564 | B1 | 8/2007 | Lynn et al. |
| 7,277,928 | B2 | 10/2007 | Lennon |
| 7,299,261 | B1 | 11/2007 | Oliver et al. |
| 7,302,117 | B2 | 11/2007 | Sekiguchi et al. |
| 7,313,805 | B1 | 12/2007 | Rosin et al. |
| 7,340,358 | B2 | 3/2008 | Yoneyama |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,526,607 | B1 | 4/2009 | Singh et al. |
| 7,529,659 | B2 | 5/2009 | Wold |
| 7,536,417 | B2 | 5/2009 | Walsh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,660,737 | B1 | 2/2010 | Lim et al. |
| 7,694,318 | B2 | 4/2010 | Eldering et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,836,054 | B2 | 11/2010 | Kawai et al. |
| 7,837,111 | B2 | 11/2010 | Yang et al. |
| 7,860,895 | B1 | 12/2010 | Scofield |
| 7,904,503 | B2 | 3/2011 | De |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,881 | B2 | 7/2011 | Culver et al. |

(56) References Cited

U.S. PATENT DOCUMENTS

| | | |
|---|---|---|
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,646 B2 | 12/2012 | Schwarzberg et al. |
| 8,326,775 B2 | 12/2012 | Raichelgauz et al. |
| 8,345,982 B2 | 1/2013 | Gokturk et al. |
| 8,457,827 B1 | 6/2013 | Ferguson et al. |
| 8,495,489 B1 | 7/2013 | Everingham |
| 8,548,828 B1 | 10/2013 | Longmire |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,875,445 B2 | 1/2018 | Amer et al. |
| 9,984,369 B2 | 5/2018 | Li et al. |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0019882 A1 | 2/2002 | Bokhani |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0113812 A1 | 8/2002 | Walker et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2002/0184505 A1 | 12/2002 | Mihcak et al. |
| 2003/0005432 A1 | 1/2003 | Ellis et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Beckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |

(56) References Cited

U.S. PATENT DOCUMENTS

| | | |
|---|---|---|
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton |
| 2006/0253423 A1 | 11/2006 | McLane et al. |
| 2006/0288002 A1 | 12/2006 | Epstein et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0179359 A1 | 8/2007 | Goodwin |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0040277 A1 | 2/2008 | DeWitt |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0163288 A1 | 7/2008 | Ghosal et al. |
| 2008/0165861 A1 | 7/2008 | Wen |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0208106 A1 | 8/2009 | Dunlop et al. |
| 2009/0216639 A1 | 8/2009 | Kapczynski et al. |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2009/0297048 A1 | 12/2009 | Slotine et al. |
| 2010/0023400 A1 | 1/2010 | DeWitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein |
| 2010/0106857 A1 | 4/2010 | Wyler |
| 2010/0125569 A1 | 5/2010 | Nair |
| 2010/0153201 A1 | 6/2010 | Rubertis et al. |
| 2010/0153209 A1 | 6/2010 | Rubertis et al. |
| 2010/0162405 A1 | 6/2010 | Cook |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0268524 A1 | 10/2010 | Nath et al. |
| 2010/0284604 A1 | 11/2010 | Chrysanthakopoulos |
| 2010/0306193 A1 | 12/2010 | Pereira et al. |
| 2010/0312736 A1 | 12/2010 | Kello |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0035289 A1 | 2/2011 | King et al. |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0208822 A1 | 8/2011 | Rathod |
| 2011/0218946 A1 | 9/2011 | Stern et al. |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll |
| 2012/0179642 A1 | 7/2012 | Sweeney et al. |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1* | 3/2013 | Berntson ............ G06F 17/30864 715/764 |
| 2013/0080433 A1 | 3/2013 | Raichelgauz et al. |
| 2013/0086499 A1 | 4/2013 | Dyor et al. |
| 2013/0089248 A1 | 4/2013 | Remiszewski |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Amgren et al. |
| 2013/0283401 A1 | 10/2013 | Pabla et al. |
| 2013/0325550 A1 | 12/2013 | Varghese et al. |

(56) References Cited

U.S. PATENT DOCUMENTS

| | | |
|---|---|---|
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1* | 10/2014 | Garcia ............... G01B 11/02 348/77 |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0120627 A1 | 4/2015 | Hunzinger et al. |
| 2015/0154189 A1 | 6/2015 | Raichelgauz et al. |
| 2015/0254344 A1 | 9/2015 | Kulkarni et al. |
| 2015/0286742 A1* | 10/2015 | Zhang ............... G06Q 30/02 715/252 |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2016/0239566 A1 | 8/2016 | Raichelgauz et al. |
| 2016/0306798 A1 | 10/2016 | Guo et al. |
| 2017/0017638 A1 | 1/2017 | Satyavarta et al. |
| 2017/0154241 A1 | 6/2017 | Shambik et al. |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shih-Fu Chang, et al., "VideoQ: A Fully Automated Video Retrieval System Using Motion Sketches", 1998, IEEE, , New York, pp. 1-2.

Wei-Te Li et al., "Exploring Visual and Motion Saliency for Automatic Video Object Extraction", IEEE, vol. 22, No. 7, Jul. 2013, pp. 1-11.

Zhu et al., Technology-Assisted Dietary Assessment. Computational Imaging VI, edited by Charles A. Bauman, Eric L. Miller, Ilya Pollak, Proc. of SPIE-IS&T Electronic Imaging, SPIE vol. 6814, 681411, Copyright 2008 SPIE-IS&T. pp. 1-10.

Brecheisen, et al., "Hierarchical Genre Classification for Large Music Collections", ICME 2006, pp. 1385-1388.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.

McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/ NetSys.2015.7089081 IEEE Conference Publications.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Mlultimedia Signal Processing (MMSP), 2012, pp. 337-342, IEEE 14th Intl. Workshop, DOI: 10.1109/MMSP.2012.6343465, Czech Republic.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

May et al., "The Transputer", Springer-Verlag, Berlin Heidelberg, 1989, teaches multiprocessing system.

Nam, et al., "Audio Visual Content-Based Violent Scene Characterization", Department of Electrical and Computer Engineering, Minneapolis, MN, 1998, pp. 353-357.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/ TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ ICME.2007.4284832 IEEE Conference Publications.

(56) References Cited

OTHER PUBLICATIONS

Boari et al, "Adaptive Routing for Dynamic Applications in Massively Parallel Architectures", 1995 IEEE, Spring 1995.
Cernansky et al., "Feed-forward Echo State Networks"; Proceedings of International Joint Conference on Neural Networks, Montreal, Canada, Jul. 31-Aug. 4, 2005.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan, et al. "Content-Based Retrieval of Music and Audio", 1997 Institute of Systems Science, National University of Singapore, Singapore (Abstract).
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
International Search Authority: "Written Opinion of the International Searching Authority" (PCT Rule 43bis.1) including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251. German National Research Center for Information Technology.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Guo et al, "AdOn: An Intelligent Overlay Video Advertising System", SIGIR, Boston, Massachusetts, Jul. 19-23, 2009.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University ADVENT technical report, 2007, pp. 222-2006-8.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.

(56) References Cited

OTHER PUBLICATIONS

The International Search Report and the Written Opinion for PCT/US2017/015831, ISA/RU, Moscow, Russia, dated Apr. 20, 2017.
Ma et el. ("Semantics modeling based image retrieval system using neural networks" 2005 (Year: 2005).
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International Journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No.1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions pn circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-Soc: A Multi-Core Soc Architecture for Multimedia Signal Processing" (2003).
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.

(56) References Cited

OTHER PUBLICATIONS

Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

\* cited by examiner

METHOD AND SYSTEM FOR DETERMINING THE DIMENSIONS OF AN OBJECT SHOWN IN A MULTIMEDIA CONTENT ITEM

CROSS-REFERENCE TO RELATED APPLICATIONS

This application claims the benefit of U.S. provisional application No. 62/030,085 filed on Jul. 29, 2014. This application is also a continuation-in-part (CIP) of U.S. patent application Ser. No. 14/096,865 filed Dec. 4, 2013 and also is a continuation-in-part (CIP) of U.S. patent application Ser. No. 13/624,397 filed on Sep. 21, 2012, now pending. The Ser. No. 13/624,397 application is a CIP of:
 (a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;
 (b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and,
 (c) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present disclosure relates generally to the analysis of multimedia content items, and more specifically to a method for determining the size dimensions of objects shown in a multimedia content item.

BACKGROUND

With the abundance of multimedia content made available through various means in general and the Internet in particular, there is also a need to provide effective ways of analyzing such multimedia content. Multimedia content analysis is a challenging task, as it requires processing of a plurality of graphical elements (e.g., multimedia elements).

Several prior art solutions can be used to analyze multimedia content items. As a result of the analysis, relevant multimedia elements may be extracted from a multimedia content item. However, a problem may occur while trying to identify information regarding the extracted multimedia elements using additional multimedia content items that may be useful, for example, multimedia content items containing similar characteristics to the characteristics of the extracted multimedia content.

Typically, while analyzing the characteristics of the multimedia content item, the complexity of a multimedia content item leads to inefficient identification of common patterns. Furthermore, the analysis as known these days may be inefficient because of lack of correlation between the multimedia elements extracted from the multimedia content item.

It would be therefore advantageous to provide an efficient solution to analyze multimedia content items. It would be further advantageous if such solution would enable identification of several multimedia elements in the multimedia content based on already identified multimedia elements.

SUMMARY

A summary of several exemplary embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain exemplary embodiments disclosed herein include a method for determining at least a size dimension of objects shown in multimedia content items. The method comprises receiving an input multimedia content item; identifying a plurality of objects shown in the input multimedia content item; generating at least a first signature for at least a first object of the plurality of objects and at least a second signature for at least a second object of the plurality of objects; identifying at least one concept that matches the at least a first object, wherein the identification is performed using the at least a first signature; determining an actual size of the at least a first object respective of the match to the at least one concept, wherein the actual size of the at least a first object is determined respective of an actual size of the at least one concept maintained in a data warehouse; determining a size scale between the at least a first object and the at least a second object of the plurality of objects using the at least a first signature and the at least a second signature; and determining the at least size dimension of the at least a second object of the plurality of objects respective of the size scale and the actual size of the first object.

Certain exemplary embodiments disclosed herein include a system for determining at least a size dimension of objects shown in a multimedia content item containing a plurality of objects. The system comprises an interface to a network for receiving an input multimedia content item; a processing unit; and a memory connected to the processing unit and configured to contain a plurality of instructions that when executed by the processor configure the system to: identify a plurality of objects shown in the input multimedia content item; identify at least one concept that matches at least a first object, wherein the identification is performed using at least a first signature; determine an actual size of the at least a first object respective of the match to the at least one concept, wherein the actual size of the at least a first object is determined respective of an actual size of the at least one concept maintained in a data warehouse; determine a size scale between the at least a first object and at least a second object of the plurality of objects using the at least a first signature and at least a second signature; and determine the at least size dimension of the at least a second object of the plurality of objects respective of the size scale and the actual size of the at least a first object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
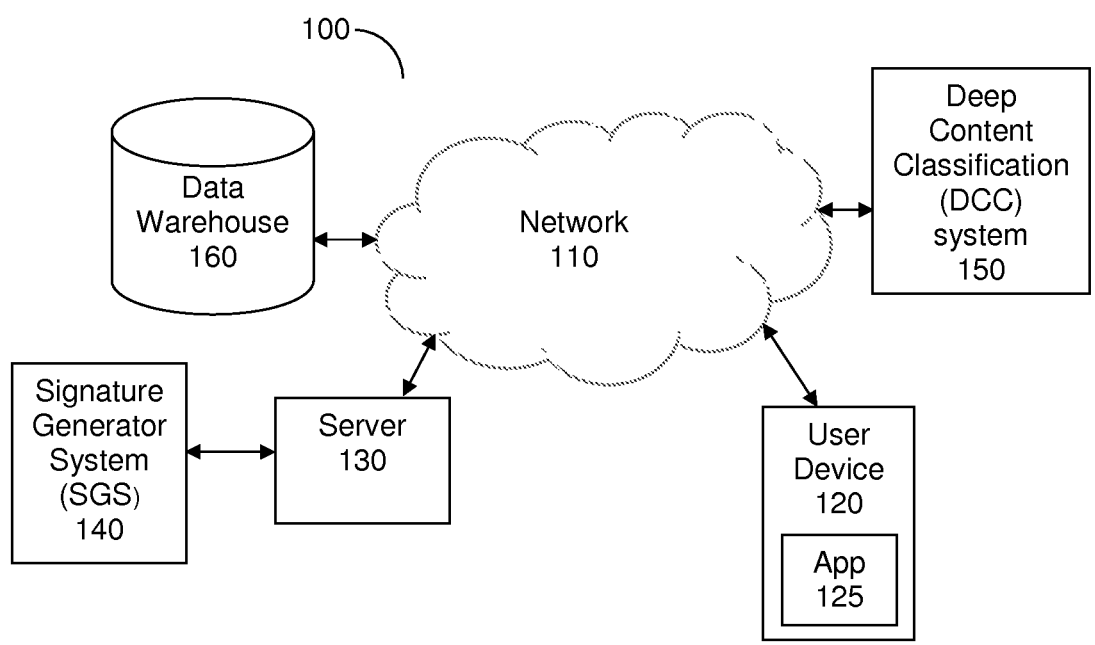
FIG. 1 is a schematic block diagram of a network system utilized to describe the various embodiments disclosed.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein include a method and system for determination of at least a size dimension of an object shown in a multimedia content item (e.g., an image, a graphic, and a photograph). The multimedia content item is received from a user device. Signatures are generated for the objects shown in the multimedia content item and a ratio between the signatures' sizes is analyzed to determine a size scale between the objects. The generated signature(s) are matched to concepts maintained in a data warehouse. Upon identifying a match between at least one signature generated for an object and at least one concept, the actual size of the identified object is retrieved from a data warehouse. The size dimensions of the other objects are determined respective of the size scale and the actual size of the identified object. According to an embodiment, the size scale between the objects is determined respective of the distance of each object from a reference point.

FIG. 1 shows an exemplary and non-limiting schematic diagram of a network system 100 utilized to describe the various embodiments disclosed herein. A network 110 is used to communicate between different parts of the network system 100. The network 110 may be the Internet, the world-wide-web (WWW), a local area network (LAN), a wide area network (WAN), a metro area network (MAN), and the like.

Further connected to the network 110 is a user device 120 configured to execute at least one application (app) 125. The application 125 may be, for example, a web browser, a script, an add-on, a mobile application ("app"), or any application programmed to interact with a server 130. In an embodiment, the server 130 may be connected to the network 110. The user device 120 may be, but is not limited to, a personal computer (PC), a personal digital assistant (PDA), a mobile phone, a smart phone, a tablet computer, a laptop, a wearable computing device, or another kind of computing device equipped with browsing, viewing, listening, filtering, and managing capabilities that is enabled as further discussed herein below. It should be noted that one user device 120 and one application 125 are illustrated in FIG. 1 only for the sake of simplicity and without limitation on the generality of the disclosed embodiments.

The network system 100 also includes a data warehouse 160 configured to store multimedia content items, previously generated signatures for objects shown in the multimedia content items, previously generated signatures for concepts or concept structures, the concepts' size, and the like. The data warehouse 160 may be connected to the network 110. In the embodiment illustrated in FIG. 1, the server 130 is communicatively connected to the data warehouse 160 through the network 110. In other non-limiting configurations, the server 130 is directly connected to the data warehouse 160.

The various embodiments disclosed herein are realized using the server 130, a signature generator system (SGS) 140 and a deep-content-classification (DCC) system 150. The SGS 140 may be connected to the server 130 directly or through the network 110. The DCC system 150 may be connected to the network 110. The server 130 is configured to receive and serve the at least one multimedia content item in which the objects are shown and cause the SGS 140 to generate at least one signature respective thereof and query the DCC system 150. To this end, the server 130 is communicatively connected to the SGS 140 and the DCC system 150.

The DCC system 150 is configured to generate concept structures (or concepts) and to identify concepts that match the multimedia content item and/or the objects shown within. A concept is a collection of signatures representing an object and metadata describing the concept. The collection is a signature reduced cluster generated by inter-matching the signatures generated for the many objects, clustering the inter-matched signatures, and providing a reduced cluster set of such clusters. As a non-limiting example, a 'Superman concept' is a signature reduced cluster of signatures describing elements (such as objects) related to, e.g., a Superman cartoon: a set of metadata including textual representations of the Superman concept. A cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed there from. In one embodiment of the invention the process of cluster reduction for the purpose of generating SRCs is performed in parallel and independently of the process described herein above.

Techniques for generating concepts and concept structures are also described in the U.S. Pat. No. 8,266,185 (hereinafter the '185 patent) to Raichelgauz, et al., which is assigned to a common assignee, and is incorporated by reference herein for all that it contains. In an embodiment, the DCC system 150 is configured and operates as the DCC system discussed in the '185 patent. The process of generating the signatures in the SGS 140 is explained in more detail below with respect to FIGS. 4 and 5.

It should be noted that each of the server 130, the SGS 140, and the DCC system 150 typically comprise a processing unit, such as a processor (not shown) or an array of processors coupled to a memory. In one embodiment, the processing unit may be realized through architecture of computational cores described in detail below. The memory contains instructions that can be executed by the processing unit. The instructions, when executed by the processing unit, cause the processing unit to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In certain implementations, the server 130 also includes an interface (not shown) to the network 110.

According to the disclosed embodiments, the server 130 is configured to receive a multimedia content item showing a plurality of objects from the user device 120. An object may be any element shown in the multimedia content item, for example, a tree, a car, a person, a table, and the like. The multimedia content item may be, but is not limited to, an image, a graphic, video frame, a photograph, and/or combinations thereof and portions thereof. In one embodiment, the server 130 is configured to receive a uniform resource locator (URL) of a webpage viewed by the user device 120 and accessed by the application 125. The webpage is processed to extract the multimedia content item contained therein.

The request to analyze the multimedia content item can be sent by a script executed in the webpage, such as when the application 125 (e.g., a web server or a publisher server) requests to upload one or more multimedia content items to the webpage. Such a request may include a URL of the webpage or a copy of the webpage. The application 125 can also send a picture taken by a user of the user device 120 to the server 130.

The server 130, in response to receiving the multimedia content item, is configured to return information respective of the size dimensions of the objects shown in the multimedia content item. To this end, the server 130 is configured to analyze the multimedia content item to identify the objects shown in the multimedia content item. As an example, an image showing Central Park in New York is analyzed to identify the objects of a carriage way, a car, a streetlight, and a person.

With this aim, at least one signature is generated for each object using the SGS 140. The generated signature(s) may be robust to noise and distortion as discussed below. Upon identifying, for example, a ratio between the signatures' sizes, a size scale between the objects is determined. According to an embodiment, parameters such as distance of each object from a reference point may be taken in account to determine the size scale.

In one embodiment, using the generated signature(s), the DCC system 150 is queried to determine if there is a match to at least one concept. The DCC system 150 is configured to return, for each matching concept, a concept's signature (or a signature reduced cluster (SRC)) and optionally the concept's metadata. It should be understood that a match exists when the signature of the concept overlaps with the signature(s) of the object above a predetermined threshold level.

Upon identification of a match, the server 130 is configured to retrieve the actual size of the identified object from the data warehouse 160. For example, if the signature identified a person, a metadata may provide information about that person's actual height. If a car was identified, its actual height or actual length may be retrieved from the data warehouse 160. After retrieving the actual size of the identified object, the server 130 is configured to determine the size dimensions of the other objects identified within the multimedia content item respective of the size scale between the objects. Such information is then sent to the user device 120.

One of ordinary skill in the art would readily appreciate that a more accurate determination of the size scale may be done by repeating the process on other identified objects, a process that can be repeated until the size scale value does not change beyond a predetermined threshold value from one identification to the other.

In another embodiment, the SGS 140 is configured to generate signatures for the received multimedia content item. The generated signatures are matched by the server 130 to previously generated signatures of concepts, maintained in the data warehouse 160, to identify a match to at least one object. Upon identification of a match, the server 130 is configured to retrieve the actual size of the identified object from the data warehouse 160. Upon identifying, for example, a ratio between the signatures' sizes, a size scale between the objects is determined. According to an embodiment, parameters such as distance of each object from a reference point may be taken in account to determine the size scale. The actual size of the identified object together with the size scale are used to determine the size dimensions of the other objects identified within the multimedia content item. Such information is then sent to the user device 120.

As a non-limiting example, when the server 130 receives an image of streets in Paris, signatures corresponding to each of the objects (e.g., different houses, Eiffel Tower, cars, and so on) shown in the image are generated. The generated signatures are matched by the server 130 to previously generated signatures of concepts stored in the data warehouse 160 to identify a match between at least a concept and at least one object, for example, the Eiffel Tower. Upon such identification, the server 130 is configured to retrieve the actual size of the Eiffel Tower from the data warehouse 160.

A size scale of the houses, the cars, the Eiffel Tower, etc., is determined by the server 130 respective of, for example, their signatures' size and their distance from a reference point. The size dimensions of the houses, the cars, etc., are determined respective of the size scale and the actual size of the Eiffel Tower.

Figure 2:
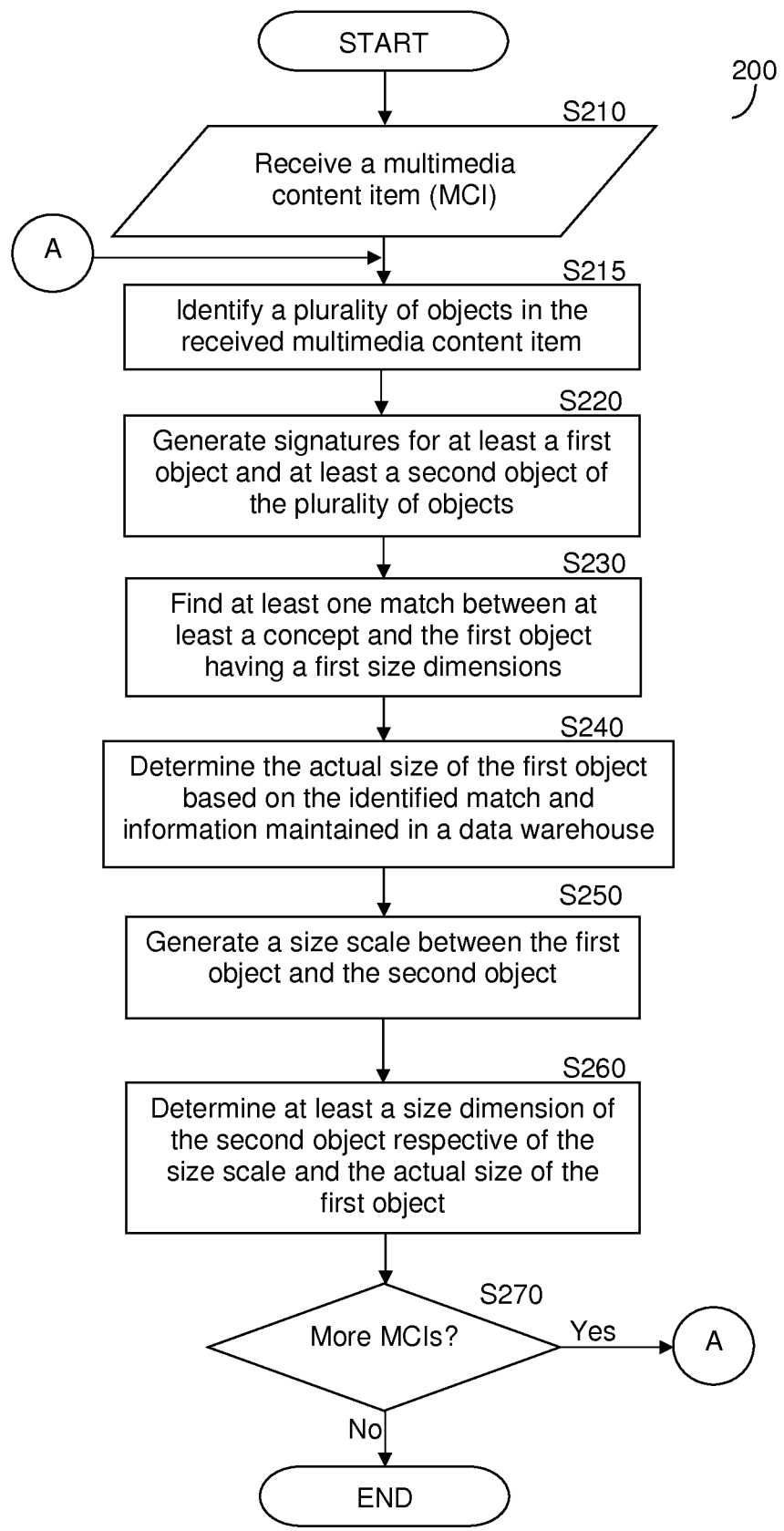
FIG. 2 is a flowchart describing a method for determination of the size dimensions of an object shown in a multimedia content item containing a plurality of objects according to an embodiment.

FIG. 2 depicts an exemplary and non-limiting flowchart 200 describing a method for identifying the size dimensions of objects shown in a multimedia content item. The method may be performed by the server 130.

In S210, a multimedia content item in which objects are shown is received. In an embodiment, the multimedia content item is received from the user device 120. In an embodiment, the multimedia content item is received together with a request to analyze the multimedia content item. Optionally, in S215, the received multimedia content item is analyzed to identify the objects. In an embodiment, the server 130 is configured to perform the analysis.

In S220, at least one signature is generated for at least two objects (e.g., a first object and a second object). The signatures are generated by the SGS 140 as described in greater detail below with respect to FIGS. 3 and 4.

In S230, a DCC system (e.g., DCC system 150) is queried to find a match between at least one concept and at least one object (e.g., the first object) using their respective signatures. In an embodiment, the signatures generated for an object is matched against the signature (signature reduced cluster (SRC)) of each concept maintained by the DCC system 150. According to an embodiment, the signatures generated for the concepts may be retrieved from a database (e.g., data warehouse 160). If the signature of the concept overlaps with the signatures of the object more than a predetermined threshold level, a match exists. Various techniques for determining matching concepts are discussed in the '185 patent. For each matching concept the respective object is determined to be identified and at least the concept signature (SRC) is returned.

For example, an image of a bowling lane may have a bowling ball, pins, and a bowler. The DCC system 150 is queried to find a match between the signatures of the pins and signatures of concepts maintained by the DCC system 150. The signature of the pins may overlap less than a predetermined threshold level with a signature of the concept "baseball" and may overlap more than a predetermined threshold level with a signature of the concept "bowling". Therefore a match would exist for "bowling" and not "baseball".

In S240, the actual size of the first object is determined respective of a match between the signatures of the concept and the first object. This is performed respective of the actual sizes of concepts or concepts structures maintained in the data warehouse 160. In another embodiment, if matching concepts are not found, the signatures generated in S220 are utilized to search the data warehouse 160.

In S250, a size scale of the objects shown in the multimedia content item is generated (e.g., the size scale of the first object and the second object). This is performed by identifying, for example, the ratio between the signature's sizes of the objects, the distance between each signature from a reference point, and so on.

In S260, at least a second size dimension of the second object shown in the multimedia content item is identified respective of the size scale and the determination made in S240 regarding the actual size of the first multimedia element.

According to an embodiment, the information respective of the size dimension of the second object is sent to the user device 120. According to another embodiment, such information is stored in the data warehouse 160 for further use (e.g., identification of the actual size of additional objects shown in additional multimedia content item). In S270, it is checked whether additional multimedia content items are received, and if so, execution continues with S210; otherwise, execution terminates.

Figure 5:
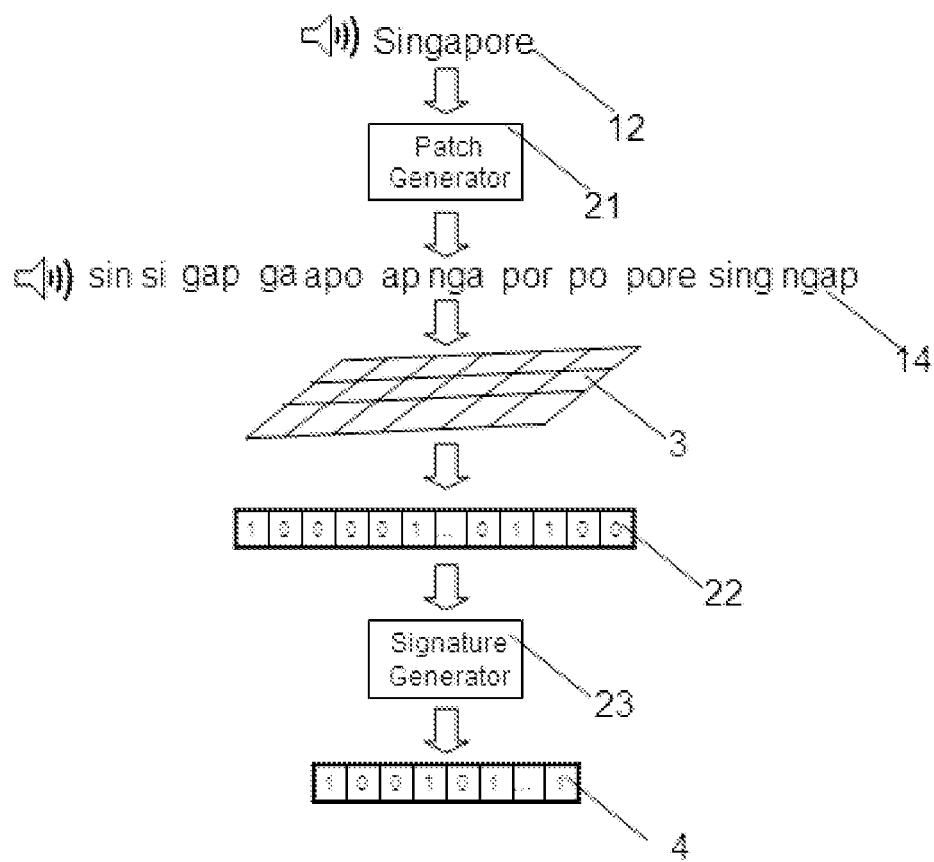
FIG. 5 is a diagram showing the flow of patches generation, response vector generation, and signature generation in a large-scale speech-to-text system.

FIG. 5 shows an exemplary and non-limiting schematic diagram of a drawing 500 utilized to describe the determination of the size dimension of an object according to an embodiment. Such determination may be performed by the server 130.

The objects of a tree 510 and a persona 520 are identified in the drawing 500 and signatures are generated respective thereof. Such signatures are analyzed for determining the size scale between the tree 510 and the persona 520. The analyses include determining that the objects are found in the same distance from a reference point 530 and identifying the ratio between the signatures' sizes. The signatures are also matched to signatures of concepts maintained in a database, such as, data warehouse 160, and the actual size of the tree 510 is identified respective thereof. Now, the height of the person 520 can be determined by using the size scale and the actual size of the tree 510.

Figure 3:
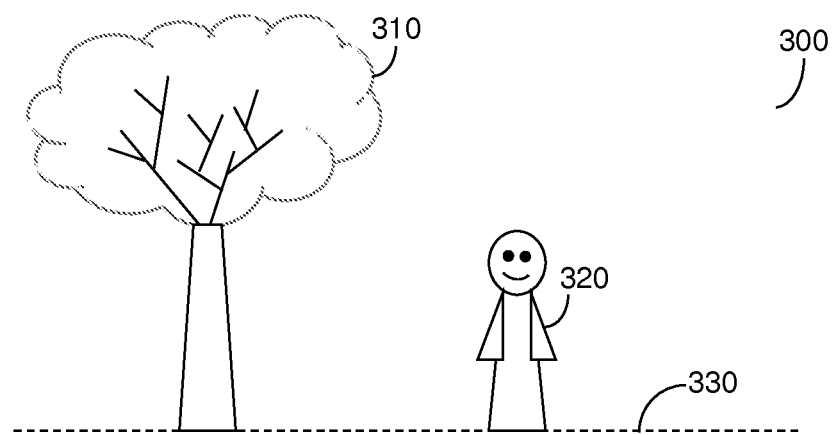
FIG. 3 is a schematic diagram for demonstrating the operation of the method discussed in FIG. 2.
Figure 4:
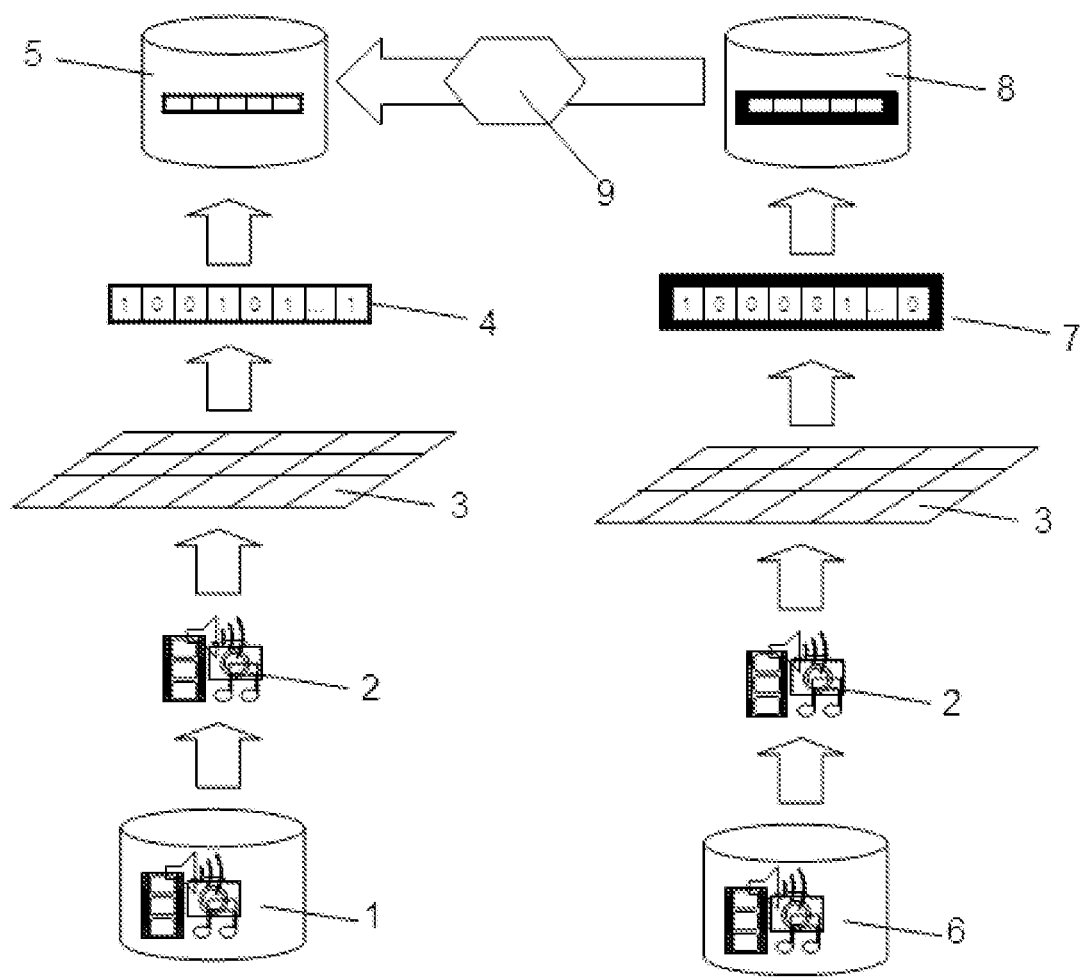
FIG. 4 is a block diagram depicting the basic flow of information in a signature generator system.

FIGS. 3 and 4 illustrate the generation of signatures for the multimedia content elements by the SGS 140 according to one embodiment. An exemplary high-level description of the process for large scale matching is depicted in FIG. 3. In this example, the matching is conducted based on video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the generation of computational Cores are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P, and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$, which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \prod \left( V_i - Th_x \right)$$

where, $\prod$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation than for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
$1 - p(V > Th_S) - 1 - (1-\varepsilon)^l \ll 1$ i.e., given that l nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need for comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases, a core represents a dynamic system, such as in state space, phase space, edge of chaos, etc., which is uniquely used herein to exploit its maximal computational power.

(c) The Cores should be optimally designed with regard to invariance to a set of signal distortions, of interest in relevant applications.

A detailed description of the Computational Core generation and the process for configuring such cores is discussed in more detail in U.S. Pat. No. 8,655,801 referenced above. The computational cores may be implemented in one or more integrated circuits.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining at least a size dimension of objects shown in multimedia content items, comprising:
   receiving an input multimedia content item;
   identifying a plurality of objects shown in the input multimedia content item;
   generating at least one first signature for at least one first object of the plurality of objects and at least one second signature for at least one second object of the plurality of objects;
   identifying, using the at least one first signature, at least one matching concept, wherein each matching concept of the at least one matching concept includes at least one signature that matches the at least one first signature; wherein each matching concept comprises a cluster of signatures of multiple multimedia content items and metadata related to the multiple multimedia content items; wherein each matching concept undergoes a cluster reduction process that comprises reducing a number of signatures of the matching cluster while remaining a minimal number of signatures that still identify all of the multiple multimedia content items; wherein for each matching cluster the cluster reduction process comprises matching signatures of each of the multimedia content items associated with the matching cluster, with a reduced cluster having one or more signatures removed there from to provide results; and determining whether to remove the one or more signatures from the concept based on the results;
   determining an actual size of the at least one first object respective of the at least one matching concept, wherein the actual size of the at least one first object is determined respective of an actual size of the at least one matching concept maintained in a data warehouse;
   determining a size scale between the at least one first object and the at least one second object of the plurality of objects using the at least one first signature and the at least one second signature; and
   determining the at least size dimension of the at least one second object of the plurality of objects respective of the size scale and the actual size of the first object.

2. The method of claim 1, further comprising: storing the determined size dimension of the at least one second object in the data warehouse.

3. The method of claim 1, wherein identifying the at least one matching concept further comprises:
querying, a deep content classification (DCC) system, using the at least one first signature to find the at least one matching concept.

4. The method of claim 1, wherein the size scale between the at least one first object and the at least one second object of the plurality of objects is determined respective of at least one of: a ratio between the at least one first signature and the at least one second signature, and the distance of the at least one first object and the at least one second object from a reference point.

5. The method of claim 1, wherein the at least one first signature for at least one first object represents a response of multiple leaky integrated-to-threshold unit nodes to the at least one first object.

6. The method of claim 1, wherein the received multimedia content item is any one of: an image, a graphic, a video frame, and a photograph.

7. A non-transitory computer readable medium having stored thereon instructions for causing one or more processing units to execute the method according to claim 1.

8. A system for determining at least a size dimension of objects shown in a multimedia content item containing a plurality of objects, comprising:
an interface to a network for receiving an input multimedia content item;
a processing unit; and
a memory connected to the processing unit and configured to contain a plurality of instructions that when executed by the processor configure the system to:
identify a plurality of objects shown in the input multimedia content item;
identify, using the at least one first signature, at least one matching concept; wherein each matching concept of the at least one matching concept includes at least one signature that matches the at least one first signature; wherein each matching concept comprises a cluster of signatures of multiple multimedia content items and metadata related to the multiple multimedia content items; wherein each matching concept undergoes a cluster reduction process that comprises reducing a number of signatures of the matching cluster while remaining a minimal number of signatures that still identify all of the multiple multimedia content items; wherein for each matching cluster the cluster reduction process comprises matching signatures of each of the multimedia content items associated with the matching cluster, with a reduced cluster having one or more signatures removed there from to provide results; and determining whether to remove the one or more signatures from the concept based on the results;
determine an actual size of the at least one first object respective of the at least one matching concept, wherein the actual size of the at least one first object is determined respective of an actual size of the at least one matching concept maintained in a data warehouse;
determine a size scale between the at least one first object and at least one second object of the plurality of objects using the at least one first signature and at least one second signature; and
determine the at least size dimension of the at least one second object of the plurality of objects respective of the size scale and the actual size of the at least one first object.

9. The system of claim 8, wherein the plurality of instructions further configure the system to: store the determined size dimension of the at least one second object in the data warehouse.

10. The system of claim 8, further comprising:
a deep content classification (DCC) system for querying the at least one first signature to find the at least one matching concept, wherein the DCC is communicatively connected to the system.

11. The system of claim 8, wherein the signatures of each object are generated by a signature generator system (SGS), wherein the SGS is communicatively connected to the system.

12. The system of claim 11, wherein the least one first signature for at least one first object represents a response of multiple leaky integrated-to-threshold unit nodes to the at least one first object.

13. The system of claim 8, wherein the size scale between the at least one first object and the at least one second object of the plurality of objects is determined respective of at least one of: a ratio between the at least one first signature and the at least one second signature, and the distance of the at least one first object and the at least one second object from a reference point.

14. The system of claim 8, wherein the received multimedia content item is any one of: an image, a graphic, a video frame, and a photograph.

15. The method of claim 1, wherein the at least one first signature for at least one first object is generated by a plurality of at least partially statistically independent computational cores that comprise multiple leaky integrated-to-threshold unit nodes.

16. The method of claim 15, wherein the plurality of at least partially statistically independent computational cores are implemented in one or more integrated circuits.

17. The system of claim 8, wherein the at least one first signature for at least one first object is generated by a plurality of at least partially statistically independent computational cores of the SGS that comprise multiple leaky integrated-to-threshold unit nodes.

18. The system of claim 17, wherein the plurality of at least partially statistically independent computational cores are implemented in one or more integrated circuits.

* * * * *